(12) United States Patent
White

(10) Patent No.: US 11,292,397 B2
(45) Date of Patent: Apr. 5, 2022

(54) TABLET HOLDING ASSEMBLY

(71) Applicant: Timothy White, Orlando, FL (US)

(72) Inventor: Timothy White, Orlando, FL (US)

( * ) Notice: Subject to any disclaimer, the term of this patent is extended or adjusted under 35 U.S.C. 154(b) by 83 days.

(21) Appl. No.: 16/942,962

(22) Filed: Jul. 30, 2020

(65) Prior Publication Data

US 2022/0032857 A1    Feb. 3, 2022

(51) Int. Cl.
*B60R 11/02* (2006.01)
*B60R 11/00* (2006.01)

(52) U.S. Cl.
CPC ... *B60R 11/0235* (2013.01); *B60R 2011/0028* (2013.01); *B60R 2011/0082* (2013.01); *B60R 2011/0084* (2013.01); *B60R 2011/0085* (2013.01)

(58) Field of Classification Search
CPC ......... B60R 11/0235; B60R 2011/0028; B60R 2011/0082; B60R 2011/0084; B60R 2011/0085
USPC ....................................................... 296/37.7
See application file for complete search history.

(56) References Cited

U.S. PATENT DOCUMENTS

| | | | |
|---|---|---|---|
| 5,370,060 A * | 12/1994 | Wang | B60N 3/004 108/149 |
| 6,992,883 B2 | 1/2006 | Oh | |
| 7,914,055 B2 | 3/2011 | Yoshinaka | |
| D736,778 S | 8/2015 | Martin | |
| 9,527,456 B2 | 12/2016 | Ackeret | |
| 11,048,105 B1 * | 6/2021 | Roy | G02F 1/0126 |
| 2004/0189881 A1 | 9/2004 | Cook | |
| 2006/0044481 A1 * | 3/2006 | Schedivy | B60R 11/02 348/837 |
| 2007/0034763 A1 | 2/2007 | Kitazawa | |
| 2007/0091215 A1 | 4/2007 | Ikunami | |
| 2007/0103855 A1 | 5/2007 | Hara | |
| 2009/0096941 A1 * | 4/2009 | Chen | B60R 11/0235 348/837 |
| 2012/0312847 A1 | 12/2012 | LaColla | |
| 2013/0193174 A1 | 8/2013 | Ackeret | |
| 2014/0246468 A1 * | 9/2014 | Montgomery | B60R 11/0229 224/548 |
| 2015/0046490 A1 * | 2/2015 | Jacobson | B60R 11/0252 707/769 |
| 2021/0312847 A1 * | 10/2021 | Liao | G09G 3/20 |

FOREIGN PATENT DOCUMENTS

| | | | | |
|---|---|---|---|---|
| EP | 3696024 A1 * | 8/2020 | ......... | B60R 11/0235 |
| FR | 2812603 A1 * | 2/2002 | ......... | B60R 11/0235 |
| WO | WO-2006117276 A1 * | 11/2006 | ......... | B60R 11/0235 |

(Continued)

*Primary Examiner* — Pinel E Romain

(57) ABSTRACT

A tablet holding assembly includes a panel that has a pair of track slots therein. A pair of arms is each pivotally coupled to and extends upwardly from the panel to releasably engage a ceiling in a vehicle. A pair of first couplers is each of the first couplers is coupled to a respective one of the arms to releasably engage the ceiling of the vehicle. A pair of second couplers is each of the second couplers is coupled to the panel to releasably engage the ceiling of the vehicle when the panel is positioned in a stored position. A pair of supports is each of the supports is coupled to the panel to support an electronic tablet on the panel. A pair of clamping units is each movably coupled to the panel to engage the electronic tablet.

12 Claims, 6 Drawing Sheets

(56) References Cited

FOREIGN PATENT DOCUMENTS

WO    WO-2006126424 A1 * 11/2006   ........... G09F 21/049
WO    WO2015032391      3/2015
WO    WO2017187066     11/2017

* cited by examiner

TABLET HOLDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tablet holding devices and more particularly pertains to a new tablet holding device for suspending an electronic tablet from a ceiling of a vehicle.

(2) Description of Related Art Including Information Disclosed Under 37 CFR 1.97 and 1.98

The prior art relates to tablet holding devices including a rotatable mount that is attachable to a ceiling for suspending an electronic display. The prior art also discloses a variety of recessed display mounts that facilitates a display to be pivotally integrated into a ceiling console of a vehicle. The prior art discloses a variety of display mounts for mounting a display in a vertical orientation from any structure other than a ceiling in a vehicle. The prior art discloses a display mount that includes a pair of arms that each engages rods on a headrest of a seat. The prior art further discloses a display mount that includes a panel and a mount that is rotatably attachable to the panel for rotatably retaining a display on the panel.

BRIEF SUMMARY OF THE INVENTION

An embodiment of the disclosure meets the needs presented above by generally comprising a panel that has a pair of track slots therein. A pair of arms is each pivotally coupled to and extends upwardly from the panel to releasably engage a ceiling in a vehicle. A pair of first couplers is each of the first couplers is coupled to a respective one of the arms to releasably engage the ceiling of the vehicle. A pair of second couplers is each of the second couplers is coupled to the panel to releasably engage the ceiling of the vehicle when the panel is positioned in a stored position. A pair of supports is each of the supports is coupled to the panel to support an electronic tablet on the panel. A pair of clamping units is each movably coupled to the panel to engage the electronic tablet.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
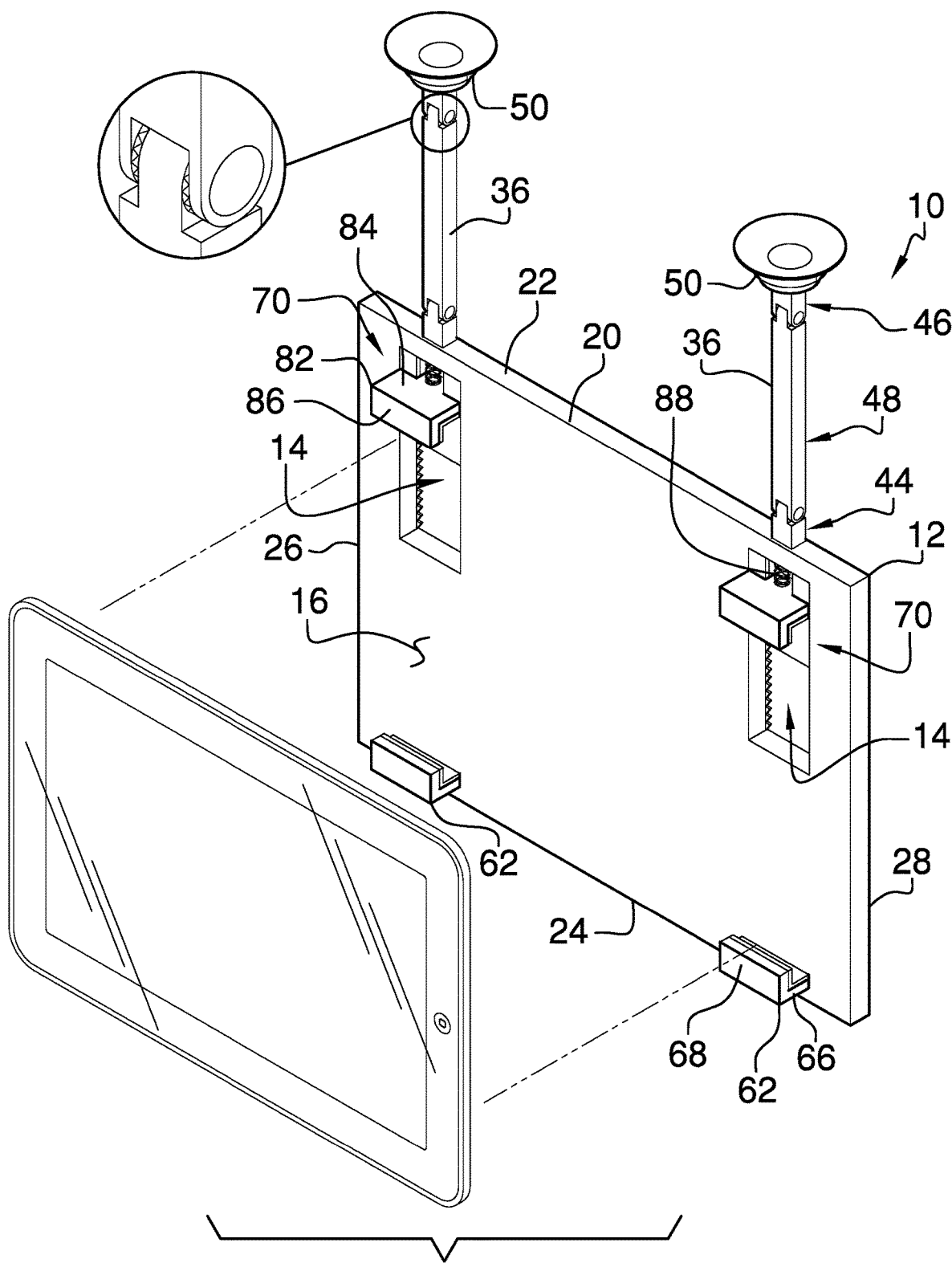
FIG. 1 is an exploded perspective view of a tablet holding assembly according to an embodiment of the disclosure.
Figure 2:
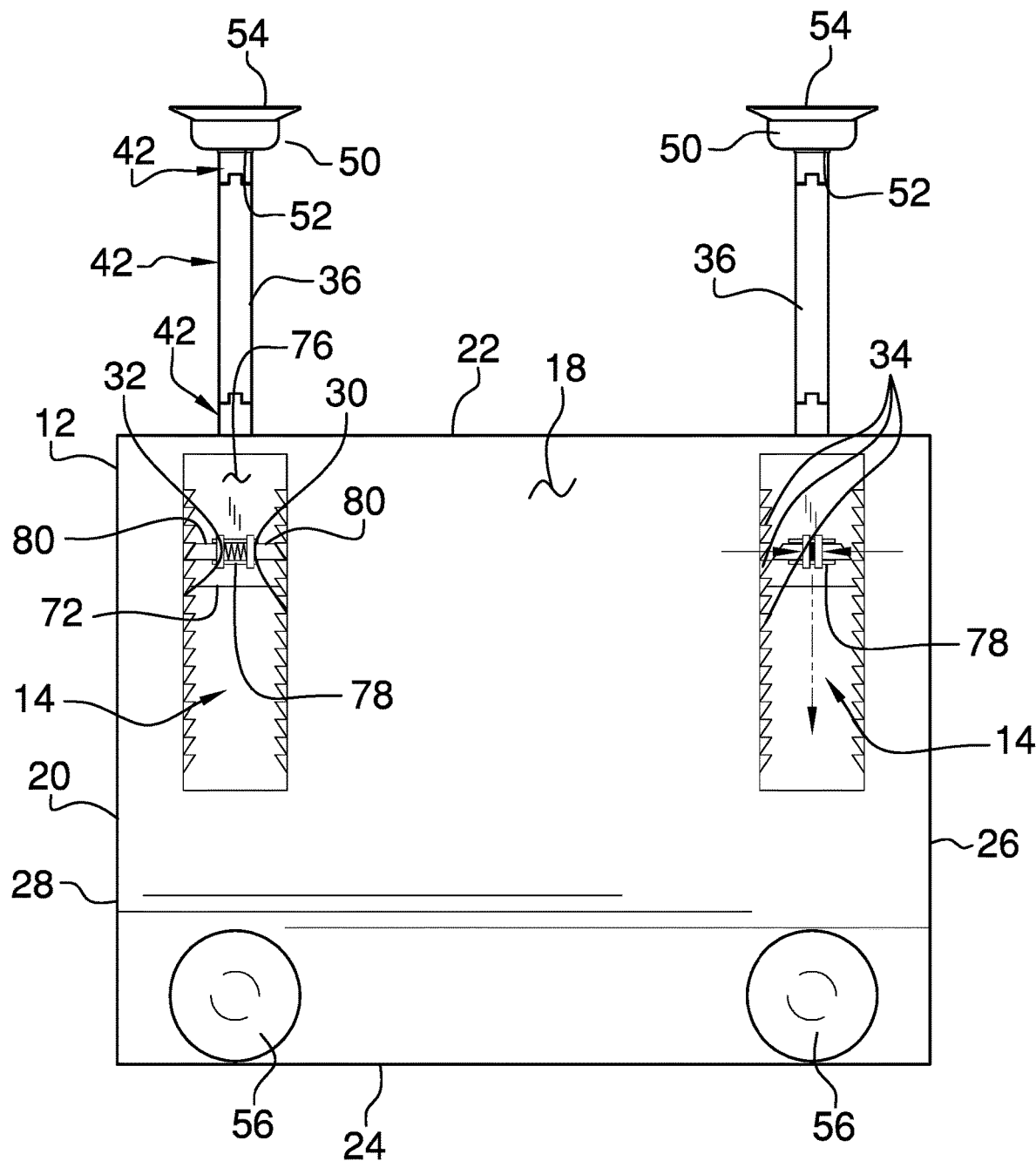
FIG. 2 is a back view of an embodiment of the disclosure.
Figure 3:
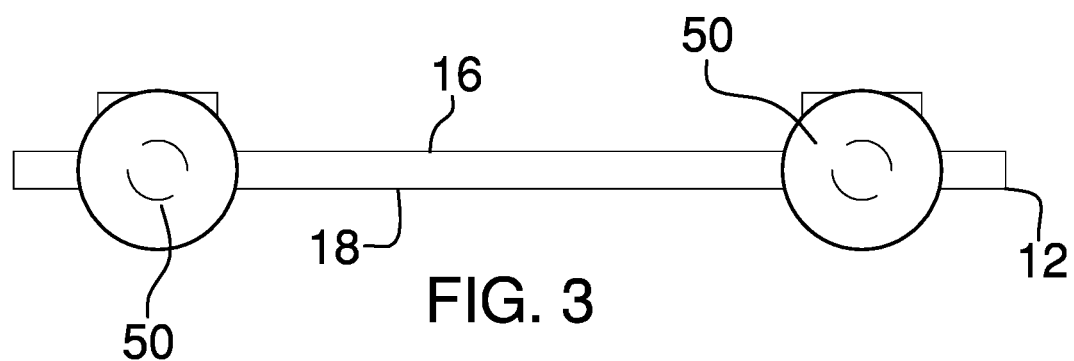
FIG. 3 is a top view of an embodiment of the disclosure.
Figure 4:
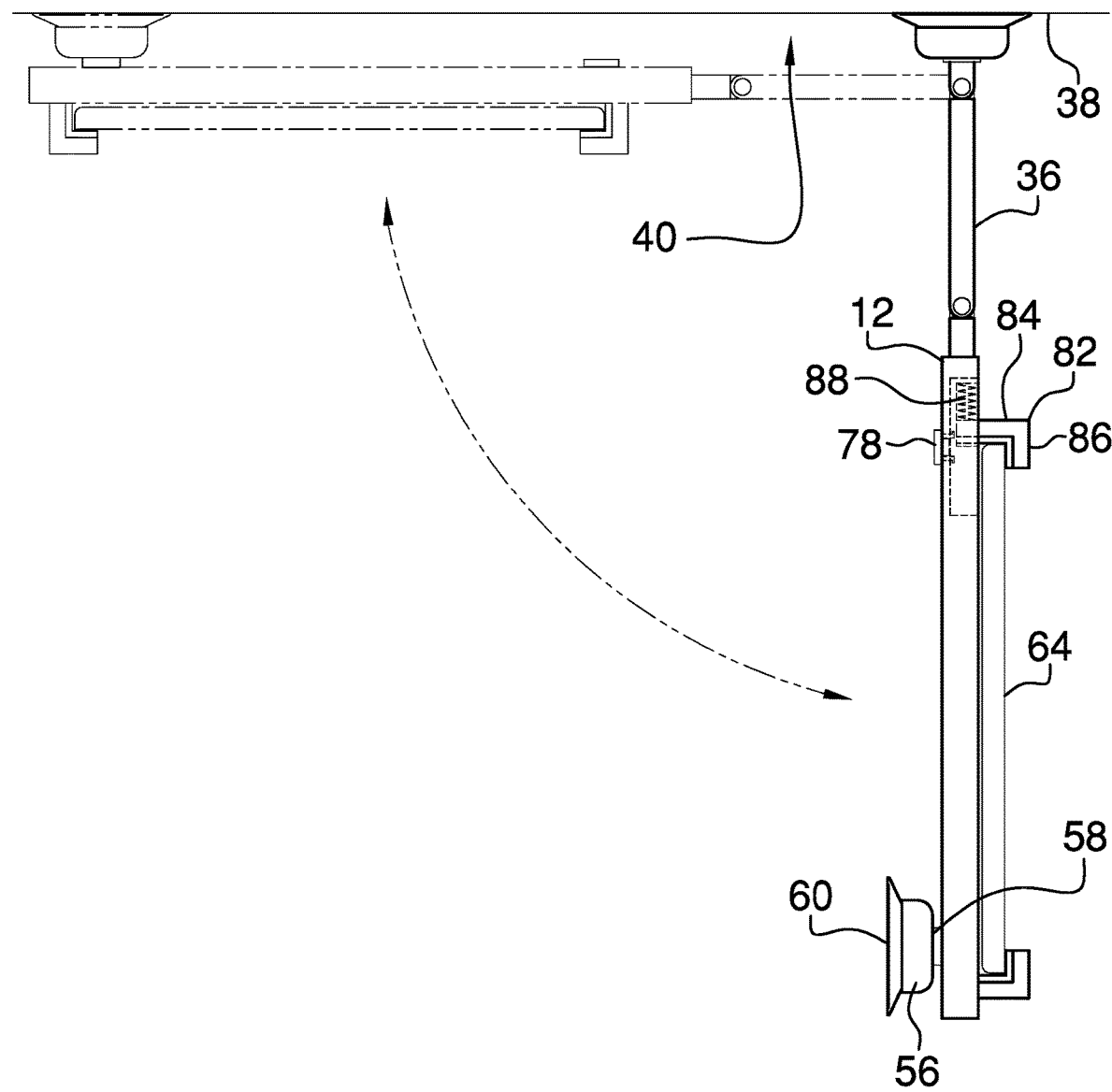
FIG. 4 is a right side view of an embodiment of the disclosure showing a panel being urged into a deployed position.
Figure 5:
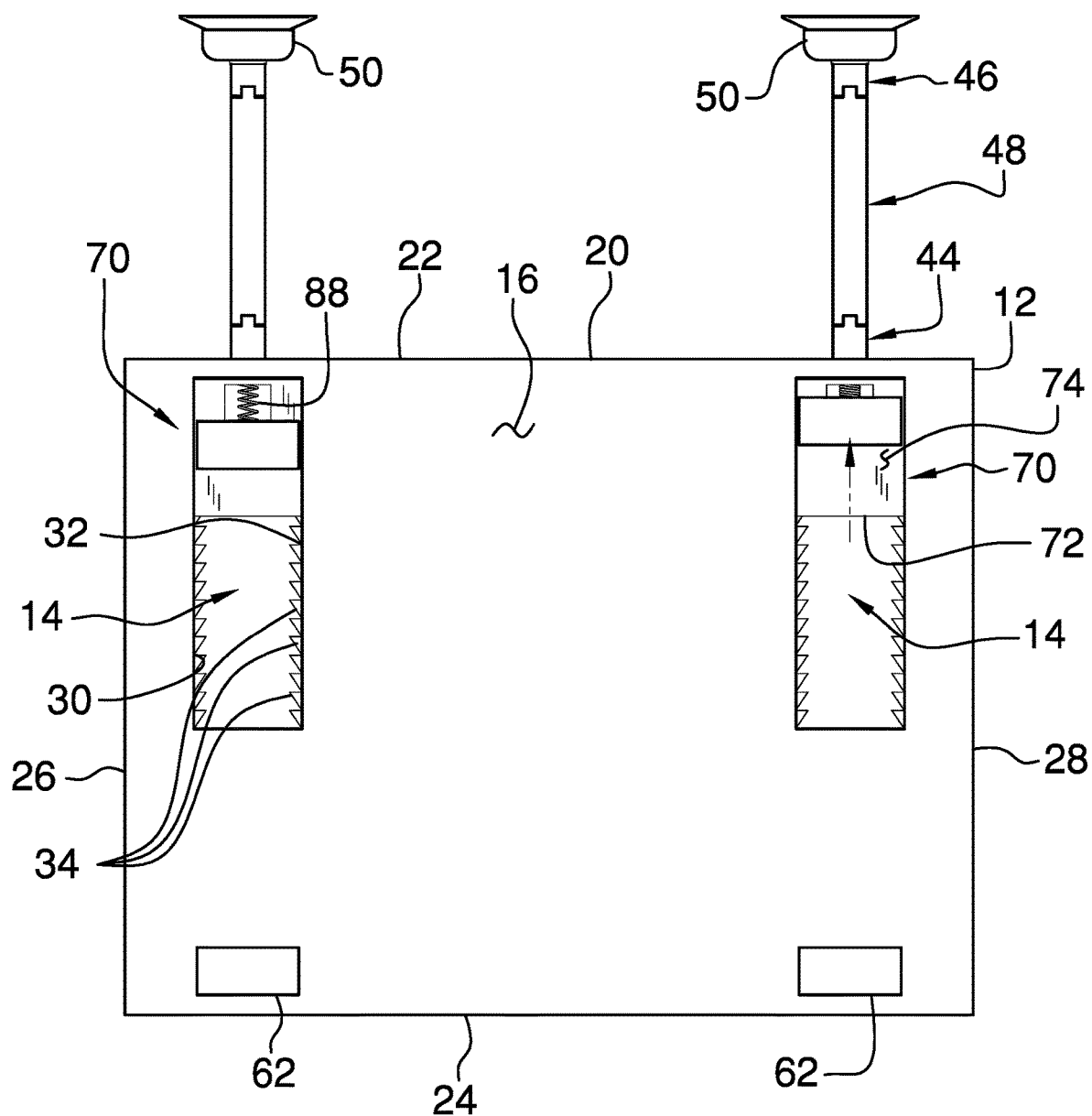
FIG. 5 is a front view of an embodiment of the disclosure.
Figure 6:
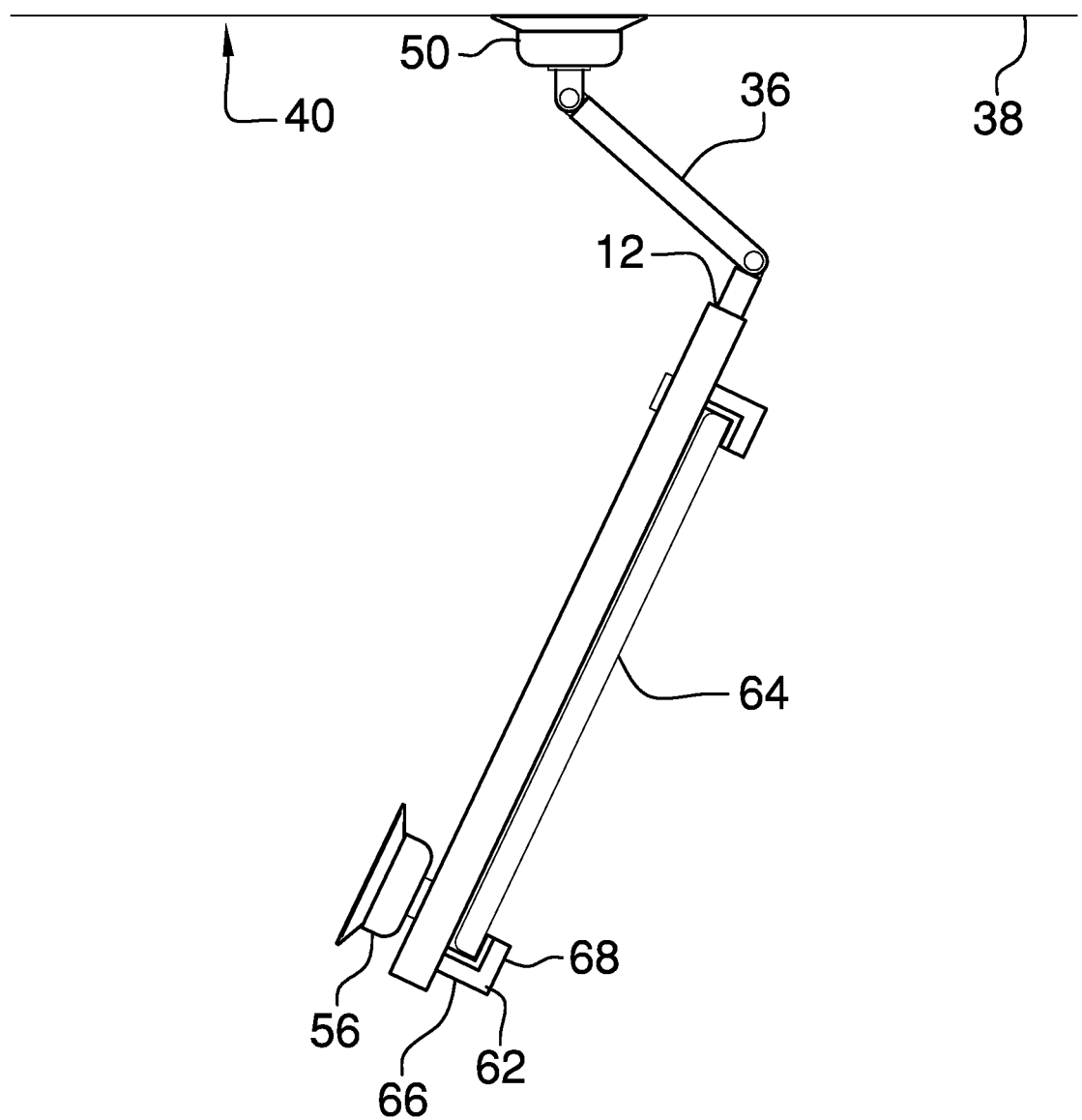
FIG. 6 is a right side in-use view of an embodiment of the disclosure.

With reference now to the drawings, and in particular to FIGS. 1 through 6 thereof, a new tablet holding device embodying the principles and concepts of an embodiment of the disclosure and generally designated by the reference numeral 10 will be described.

As best illustrated in FIGS. 1 through 6, the tablet holding assembly 10 generally comprises a panel 12 that has a pair of track slots 14 therein. The panel 12 has a front surface 16, a back surface 18 and a perimeter edge 20 extending therebetween, and the perimeter edge 20 has a top side 22, a bottom side 24, a first lateral side 26 and a second lateral side 28. Each of the track slots 14 extends through the front surface 16 and the back surface 18, and each of the track slots 14 extends along a line extending between the top side 22 and the bottom side 24 of the perimeter edge 20. Each of the track slots 14 is positioned closer to the top side 22 than the bottom side 24, and each of the track slots 14 is positioned adjacent to a respective one of the first lateral side 26 and the second lateral side 28 of the perimeter edge 20. Each of the track slots 14 has a first lateral bounding edge 30 and a second lateral bounding edge 32. Each of the first lateral bounding edge 30 and the second lateral bounding edge 32 of each of the track slots 14 has a plurality of detents 34 extending along a full length of the first lateral bounding edge 30 and the second lateral bounding edge 32.

A pair of arms 36 is each pivotally coupled to and extends upwardly from the panel 12 to releasably engage a ceiling 38 in a vehicle 40. The vehicle 40 may be a passenger vehicle, such as a van or the like, that commonly transports children in a back seat. Each of the arms 36 comprises a plurality of sections 42 that are pivotally coupled together such that each of the arms 36 is positionable at a plurality of angles with respect to the panel 12. The panel 12 is positionable in a deployed position having the panel 12 extending downwardly from the ceiling 38 of the vehicle 40. Conversely, the panel 12 is positionable in a stored position having the panel 12 extending along a line is oriented parallel to the ceiling 38.

The plurality of sections 42 includes a lower section 44, an upper section 46 and a middle section 48 extending between the lower section 44 and the upper section 46. The lower section 44 of a respective one of the arms 36 releasably engages the middle section 48 of the respective arm. In this way, the middle section 48 of the respective arm 36 is retained at a preferred angle with respect to the lower section 44 of the respective arm 36. The upper section 46 of the respective arm 36 releasably engages the middle section 48 of the respective arm. In this way the upper section 46 of the respective arm 36 is retained at a preferred angle with respect to the middle section 48 of the respective arm 36. Additionally, the lower section 44 of each of the arms 36 is coupled to the top side 22 of the perimeter edge 20 of the panel 12.

A pair of first couplers 50 is provided and each of the first couplers 50 is coupled to a respective one of the arms 36 to releasably engage the ceiling 38 of the vehicle 40. Each of the first couplers 50 has a first end 52 and a second end 54, and each of the first couplers 50 flares outwardly between the first end 52 and the second end 54 such that each of the first couplers 50 forms a suction cup. The first end 52 of each of the first couplers 50 is coupled to the upper section 46 of a respective one of the arms 36.

A pair of second couplers 56 is provided and the each of the second couplers 56 is coupled to the panel 12. Each of the second couplers 56 releasably engages the ceiling 38 of the vehicle 40 when the panel 12 is positioned in the stored position. Each of the second couplers 56 has a primary end 58 and a secondary end 60, and each of the second couplers 56 flares outwardly between the primary end 58 and the secondary end 60 such that each of the second couplers 56 forms a suction cup. The primary end 58 of each of the second couplers 56 is coupled to the back surface 18 of the panel 12. Each of the second couplers 56 is positioned adjacent to the bottom side 24 of the perimeter edge 20 of the panel 12.

A pair of supports 62 is provided and each of the supports 62 is coupled to and extends away from the panel 12 to support an electronic tablet 64 on the panel 12. Each of the supports 62 comprises a leg 66 extending forwardly from the front surface 16 of the panel 12 and a foot 68 extending upwardly from the leg 66. The foot 68 of each of the supports 62 is spaced from the front surface 16 of the panel 12 and each of the supports 62 is aligned with the bottom side 24 of the perimeter edge 20. The electronic tablet 64 may be an Apple iPad, a Samsung Note or any other similar type of electronic tablet that is commonly employed for viewing digital video.

A pair of clamping units 70 is provided and each of the clamping units 70 is movably coupled to the panel 12 to engage the electronic tablet 64. Each of the clamping units 70 is positionable a variety of distances from the supports 62. In this way each of the clamping units 70 can accommodate a variety of sizes of electronic tablets. Each of the clamping units 70 comprises a slide 72 that is slidably positioned in a respective one of the track slots 14 in the panel 12. The slide 72 has a forward surface 74 and a rearward surface 76.

Each of the clamping units 70 includes an engagement 78 that is coupled to the rearward surface 76 of the slide 72. The engagement 78 includes a pair of fingers 80 that each extends laterally toward a respective one of the first lateral bounding edge 30 and the second lateral bounding edge 32 of the respective track slot 14. Each of the fingers 80 is biased away from each other to engage a respective one of the detents 34 in the respective first lateral bounding edge 30 or the second lateral bounding edge 32. In this way the slide 72 is retained at a selected position along the respective track slot 14. Moreover, each of the fingers 80 is urgeable toward each other to disengage the detents 34 thereby facilitating the slide 72 to be moved upwardly or downwardly in the respective track slot 14.

Each of the clamping units 70 includes a grip 82 that comprises a leg 84 extending forwardly from the forward surface 74 of the slide 72 and a foot 86 extending downwardly from the leg 84 of the grip 82. The foot 86 of the grip 82 is spaced from the forward surface 74 of the slide 72 and the leg 84 of the grip 82 abuts the electronic tablet 64 for retaining the electronic tablet 64 on the panel 12. Each of the clamping units 70 includes a biasing member 88 that is coupled between the leg 84 of the grip 82 and the slide 72 thereby facilitating the grip 82 to be movably attached to the slide 72. Additionally, the biasing member 88 biases the grip 82 downwardly on the slide 72 for compressing the grip 82 against the tablet 64.

In use, each of the first couplers 50 is attached to the ceiling 38 of the vehicle 40 and the electronic table is positioned on each of the supports 62. Each of the clamping units 70 is urged downwardly to engage the electronic tablet 64. In this way the electronic tablet 64 is retained on the panel 12 thereby facilitating the electronic tablet 64 to be viewed by occupants in the back seat of the vehicle 40. The panel 12 can be positioned in the stored position when the electronic tablet 64 is not being viewed. The first couplers 50 and the second couplers 56 facilitate the panel 12 to be removed from the ceiling 38 of the vehicle 40 at any time.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tablet holding assembly for holding an electronic tablet in a viewing position within a vehicle, said assembly comprising:
   a panel having a pair of track slots therein;
   a pair of arms, each of said arms being pivotally coupled to and extending upwardly from said panel wherein each of said arms is configured to releasably engage a ceiling in a vehicle, each of said arms comprising a plurality of sections being pivotally coupled together such that each of said arms is positionable at a plurality of angles with respect to said panel, said panel being positionable in a deployed position having said panel extending downwardly from the ceiling of the vehicle, said panel being positionable in a stored position having said panel extending along a line being oriented parallel to the ceiling;
   a pair of first couplers, each of said first couplers being coupled to a respective one of said arms wherein each of said first couplers is configured to releasably engage the ceiling of the vehicle;
   a pair of second couplers, each of said second couplers being coupled to said panel, each of said second couplers releasably engaging the ceiling of the vehicle when said panel is positioned in said stored position;
   a pair of supports, each of said supports being coupled to and extending away from said panel wherein each of said supports is configured to support an electronic tablet on said panel; and
   a pair of clamping units, each of said clamping units being movably coupled to said panel wherein each of said clamping units is configured to engage the electronic tablet, each of said clamping units being positionable a variety of distances from said supports wherein each of said clamping units is configured to accommodate a variety of sizes of electronic tablets.

2. The assembly according to claim 1, wherein said panel has a front surface, a back surface and a perimeter edge extending therebetween, said perimeter edge having a top side, a bottom side, a first lateral side and a second lateral side, each of said track slots extending through said front surface and said back surface, each of said track slots extending along a line extending between said top side and said bottom side of said perimeter edge, each of said track slots being positioned closer to said top side than said bottom side, each of said track slots being positioned adjacent to a respective one of said first lateral side and said second lateral side of said perimeter edge.

3. The assembly according to claim 2, wherein each of said track slots has a first lateral bounding edge and a second lateral bounding edge, each of said first lateral bounding edge and said second lateral bounding edge of each of said track slots having a plurality of detents extending along a full length of said first lateral bounding edge and said second lateral bounding edge.

4. The assembly according to claim 1, wherein said plurality of sections of said arms includes a lower section, an upper section and a middle section extending between said lower section and said upper section, said lower section of a respective one of said arms releasably engaging said middle section of said respective arm for releasably retaining said middle section of said respective arm at a preferred angle with respect to said lower section of said respective arm, said upper section of said respective arm releasably engaging said middle section of said respective arm for retaining said upper section of said respective arm at a preferred angle with respect to said middle section of said respective arm, said lower section of each of said arms being coupled to a top side of a perimeter edge of said panel.

5. The assembly according to claim 4, wherein each of said first couplers has a first end and a second end, each of said first couplers flaring outwardly between said first end and said second end such that each of said first couplers forms a suction cup, said first end of each of said first couplers being coupled to said upper section of a respective one of said arms.

6. The assembly according to claim 2, wherein each of said second couplers has a primary end and a secondary end, each of said second couplers flaring outwardly between said primary end and said secondary end such that each of said second couplers forms a suction cup, said primary end of each of said second couplers being coupled to said back surface of said panel, each of said second couplers being positioned adjacent to said bottom side of said perimeter edge of said panel.

7. The assembly according to claim 2, wherein each of said supports comprises a leg extending forwardly from said front surface of said panel and a foot extending upwardly from said leg, said foot of each of said supports being spaced from said front surface of said panel, each of said supports being aligned with said bottom side of said perimeter edge.

8. The assembly according to claim 3, wherein each of said clamping units comprises a slide being slidably positioned in a respective one of said track slots in said panel, said slide having a forward surface and a rearward surface.

9. The assembly according to claim 8, wherein each of said clamping units comprises an engagement being coupled to said rearward surface of said slide, said engagement including a pair of fingers each extending laterally toward a respective one of said first lateral bounding edge and said second lateral bounding edge of said respective track slot, each of said fingers being biased away from each other to engage a respective one of said detents in said respective first lateral bounding edge or said second lateral bounding edge for retaining said slide at a selected position along said respective track slot, each of said fingers being urgeable toward each other to disengage said detents thereby facilitating said slide to be moved upwardly or downwardly in said respective track slot.

10. The assembly according to claim 8, wherein each of said clamping units includes a grip comprising a leg extending forwardly from said forward surface of said slide and a foot extending downwardly from said leg of said grip, said foot of said grip being spaced from said forward surface of said slide wherein said leg of said grip is configured to abut the electronic tablet for retaining the electronic tablet on said panel.

11. The assembly according to claim 10, wherein each of said clamping units includes a biasing member being coupled between said leg of said grip and said slide thereby facilitating said grip to be movably attached to said slide, said biasing member biasing said grip downwardly on said slide for compressing said grip against the tablet.

12. A tablet holding assembly for holding an electronic tablet in a viewing position within a vehicle, said assembly comprising:
   a panel having a pair of track slots therein, said panel having a front surface, a back surface and a perimeter edge extending therebetween, said perimeter edge having a top side, a bottom side, a first lateral side and a second lateral side, each of said track slots extending through said front surface and said back surface, each of said track slots extending along a line extending between said top side and said bottom side of said perimeter edge, each of said track slots being positioned closer to said top side than said bottom side, each of said track slots being positioned adjacent to a respective one of said first lateral side and said second lateral side of said perimeter edge, each of said track slots having a first lateral bounding edge and a second lateral bounding edge, each of said first lateral bounding edge and said second lateral bounding edge of each of said track slots having a plurality of detents extending along a full length of said first lateral bounding edge and said second lateral bounding edge;

a pair of arms, each of said arms being pivotally coupled to and extending upwardly from said panel wherein each of said arms is configured to releasably engage a ceiling in a vehicle, each of said arms comprising a plurality of sections being pivotally coupled together such that each of said arms is positionable at a plurality of angles with respect to said panel, said panel being positionable in a deployed position having said panel extending downwardly from the ceiling of the vehicle, said panel being positionable in a stored position having said panel extending along a line being oriented parallel to the ceiling, said plurality of sections including a lower section, an upper section and a middle section extending between said lower section and said upper section, said lower section of a respective one of said arms releasably engaging said middle section of said respective arm for releasably retaining said middle section of said respective arm at a preferred angle with respect to said lower section of said respective arm, said upper section of said respective arm releasably engaging said middle section of said respective arm for retaining said upper section of said respective arm at a preferred angle with respect to said middle section of said respective arm, said lower section of each of said arms being coupled to said top side of said perimeter edge of said panel;

a pair of first couplers, each of said first couplers being coupled to a respective one of said arms wherein each of said first couplers is configured to releasably engage the ceiling of the vehicle, each of said first couplers having a first end and a second end, each of said first couplers flaring outwardly between said first end and said second end such that each of said first couplers forms a suction cup, said first end of each of said first couplers being coupled to said upper section of a respective one of said arms;

a pair of second couplers, each of said second couplers being coupled to said panel, each of said second couplers releasably engaging the ceiling of the vehicle when said panel is positioned in said stored position, each of said second couplers having a primary end and a secondary end, each of said second couplers flaring outwardly between said primary end and said secondary end such that each of said second couplers forms a suction cup, said primary end of each of said second couplers being coupled to said back surface of said panel, each of said second couplers being positioned adjacent to said bottom side of said perimeter edge of said panel;

a pair of supports, each of said supports being coupled to and extending away from said panel wherein each of said supports is configured to support an electronic tablet on said panel, each of said supports comprising a leg extending forwardly from said front surface of said panel and a foot extending upwardly from said leg, said foot of each of said supports being spaced from said front surface of said panel, each of said supports being aligned with said bottom side of said perimeter edge; and a pair of clamping units, each of said clamping units being movably coupled to said panel wherein each of said clamping units is configured to engage the electronic tablet, each of said clamping units being positionable a variety of distances from said supports wherein each of said clamping units is configured to accommodate a variety of sizes of electronic tablets, each of said clamping units comprising:

a slide being slidably positioned in a respective one of said track slots in said panel, said slide having a forward surface and a rearward surface;

an engagement being coupled to said rearward surface of said slide, said engagement including a pair of fingers each extending laterally toward a respective one of said first lateral bounding edge and said second lateral bounding edge of said respective track slot, each of said fingers being biased away from each other to engage a respective one of said detents in said respective first lateral bounding edge or said second lateral bounding edge for retaining said slide at a selected position along said respective track slot, each of said fingers being urgeable toward each other to disengage said detents thereby facilitating said slide to be moved upwardly or downwardly in said respective track slot;

a grip comprising a leg extending forwardly from said forward surface of said slide and a foot extending downwardly from said leg of said grip, said foot of said grip being spaced from said forward surface of said slide wherein said leg of said grip is configured to abut the electronic tablet for retaining the electronic tablet on said panel; and a biasing member being coupled between said leg of said grip and said slide thereby facilitating said grip to be movably attached to said slide, said biasing member biasing said grip downwardly on said slide for compressing said grip against the tablet.

\* \* \* \* \*